May 26, 1970 J. P. PAWLETKO ET AL 3,513,774

PRINTER HAMMER COMPENSATION

Filed July 1, 1968 4 Sheets-Sheet 1

INVENTORS.
JOSEPH P. PAWLETKO
CHARLES O. ROSS

BY Francis V. Giolma
ATTORNEY

May 26, 1970 J. P. PAWLETKO ET AL 3,513,774

PRINTER HAMMER COMPENSATION

Filed July 1, 1968

4 Sheets-Sheet 4

United States Patent Office 3,513,774

Patented May 26, 1970

3,513,774

PRINTER HAMMER COMPENSATION

Joseph P. Pawletko, Endwell, and Charles O. Ross, Endicott, N.Y., assignors to International Business Machines Corporation, Armonk, N.Y., a corporation of New York Filed July 1, 1968, Ser. No. 741,560
Int. Cl. B41j 9/30; H01h 47/32
U.S. Cl. 101—93 10 Claims

ABSTRACT OF THE DISCLOSURE

In a high speed printer having electromagnetically controlled print hammers which are activated to print by an enabling signal in timed relation with the movement of a moving type character bearing element, corrections in the timing of the enabling signal are made to compensate for variations in parameters such as the source voltage and the velocity of the character bearing element, and thus produce more uniform print quality.

Field of invention

This invention relates to high speed printers having movable type character bearing elements and associated print hammers which are activated in timed relation with movement of these elements past the different print positions to impact a document for printing selected characters thereon.

Description of prior art

Heretofore, compensation for variations in flight time of print hammers caused by manufacturing tolerances and the like has been provided by the use of manually-adjusted delay circuits or the like as in Pat. No. 3,183,830 to D. M. Fisher et al. which issued on May 18, 1965.

Summary of invention

Generally stated, it is an object of this invention to provide an improved control circuit for printers.

More specifically, it is an object of this invention to provide not only fixed or static compensation for correcting variations in flight time of the print hammers in a printer, but to provide also dynamic compensation for factors which vary from time to time in the printer and its control circuits.

It is an object of this invention to provide for controlling the activating of the print hammers in a high speed printer in accordance with one or more variable quantities.

Another object of the invention is to provide in a printer for varying the time relation of an enabling signal for a print hammer, in accordance with variations in the voltage of the machine power supply and/or the speed of a movable character bearing type element which is to be impacted to print on a document.

Yet another object of the invention is to develop velocity, voltage, and other varying parameter error signals and utilize them to correct the timing of a print hammer enabling signal.

Yet another object of the invention is to provide for developing an analog velocity error signal for a movable type character bearing element, and for using this signal to provide a time corrected print hammer enabling signal.

It is also an important object of the invention to provide for cascading velocity and voltage error correcting circuits in a print hammer control circuit.

Still another object of the invention is to provide for using source voltage and type character velocity error signals to reference constant current source ramp circuits and produce time corrections in a print hammer enabling signal.

Another important object of the invention is to provide for using a constant current ramp referenced to an error signal for operating a Schmitt trigger to provide a time-corrected enabling signal for use in a print hammer control circuit.

In accordance with a preferred form of the invention compensation for variations in type train velocity and source voltage is effected by having timing drum pulses from an emitter driven in synchronism with a type chain/train applied to a stabilized single shot and a two-section filter to develop a velocity error voltage. This voltage is used as a reference for a constant current ramp connected to a Schmitt trigger for developing a velocity error time-corrected timing pulse. This pulse is then applied to a voltage correction circuit which incorporates a constant current ramp referenced to a voltage error signal. This ramp is connected to a Schmitt trigger for developing a further time-corrected timing pulse, which is now both velocity and voltage error time compensated, and may be used to control a clock and enable selected hammer firing circuits which were heretofore enabled by an uncorrected drum pulse from the emitter.

The foregoing and other objects, features and advantages of the invention will be apparent from the following more particular description of preferred embodiments of the invention as illustrated in the accompanying drawings.

Description of preferred embodiments

Figure 1:
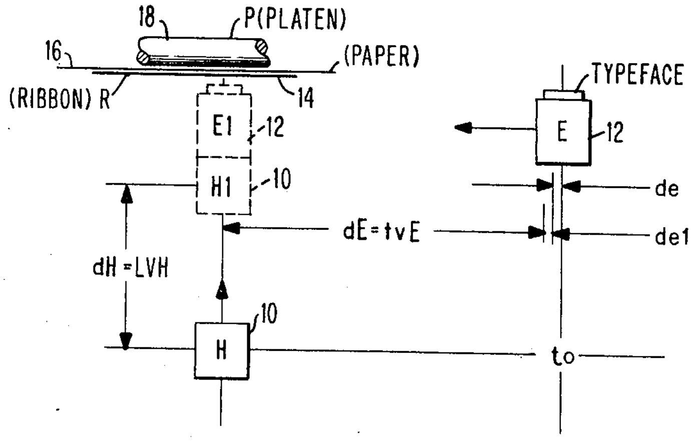
FIG. 1 is a schematic view in part of a printer mechanism showing variations in the relations between a print hammer and a moving type element which it impacts.

In mechanical printers, factors which influence the physical relationship (timing) between the hammers and the type elements at their impact point generally cause deterioration of print quality, registration, or wear of components, or a combination of these. These factors increase manufacturing and servicing costs for a given printing speed. The present invention relates to compensation for the various mechanical and electrical parameters affecting print quality, registration, and mechanism wear which cannot be designed out due to economic or technology limitations. It also provides a means to precisely and quickly adjust the relative timing between the hammer and type for all print positions.

Ideally, a print magnet is energized under the control of a transducer pulse thta is related in time to the position of the type element at the moment the hammer strikes it (a typical such arrangement is shown in Pat. No. 3,289,576 which issued on Dec. 6, 1966 to E. M.

Bloom et al. and is assigned to the assignee of this application). However, once a magnet is impulsed, the relative positions of the type and hammer become asynchronous. It is desired that they should always strike in the same relative position. However, their relative positions can vary at the time of impact because each is vulnerable to varying parameters once they have become asynchronous. These parameters are comprised of (a) variables that are unrelated between print positions and which are not particularly covered by this invention except as they could be lumped by groups of positions (i.e. average temperature distribution sensed at several points with subgroup compensation) and (b) variables that within a small factor affect all positions alike.

Compensation may be accomplished generally in two parts:

(a) A basic manually and electrically variable delay circuit can be inserted in each print magnet circuit. A nominal delay is effected so that relative positive and negative parameter variations may be tolerated. At the same time, this arrangement allows a final electronic adjustment of relative timing by manually changing the nominal delay. It compensates for parameters that are different from position to position, but unchanging on a short-term basis. This manual adjustment (1) allows precise timing not feasible by mechanical adjustment and (2) makes feasible periodic recheck and readjustment because of the relative speed of adjustment compared to the mechancial method.

(b) A combined analog control voltage is developed once per machine except for subgroups as justified and is distributed to all position delay circuits for modulation of the individual delay times by a like amount.

Operation proceeds on the fact that once the magnet is energized, all control is lost; therefore compensation occurs by controlling when the magnet is to be energized. Accuracy of compensation is reduced to the practical limits of circuit stability plus the extent to which the corrected paramaters vary during their respective vulnerable periods.

Examples of items that can be compensated for are (a) magnet supply voltage (b) temperature (c) power line frequency (d) torque angle of the type drive system with load variations which appears to be a rapid excursion of line frequency, and (e) angular position error in the signal from the transducer which indicates type position.

In the case of a transducer using a slotted disc it becomes economically unfeasible to place the required number of slots to the required accuracy around the disc. Practice uses a submultiple number of slots and generates the intervening pulses by electronic dead-reckoning. Since the electronics is based on a crystal clock, its time is accurate and unchanging, relatively. Because of this, an additional error is introduced in the hammer/type relationship equal to dead-reckoning period times the percentage error in the type velocity during that time. The proposed technique can remove this problem by (1) operating an oscillator at a frequency to produce the desired number of pulses and (2) phase lock it to the desired multiple frequency of the slotted disc transducer.

Referring particularly to FIG. 1 of the drawings, the reference numeral 10 designates schematically a type hammer which is positioned initially in position H to impact a moving type element 12 for impacting a ribbon 14 against a paper document 16 which is backed up by a platen 18 for effecting a printing operation. The solid outlines denote the initial positions (H) of the type hammer and (E) of the type element while the dotted outlines (H1), (E1) indicate the final positions thereof.

The following designations are used to identify the hammer and type element relationships.

HAMMER AND TYPE ELEMENT RELATIONSHIPS

H=hammer position at time $t_0$
H1=hammer final position
E=type element position at $t_0$ exclusive of *de*
E1=type element final position (shown at nominal)
$t_0$=time when magnet is impulsed
*t*=time between $t_0$ and impact at E1H1
*d*H=hammer travel in inches (fixed)
*v*H=average hammer velocity in inches/sec.
*d*E=type element travel in inches during time *t*
*v*E=average type element velocity in inches/sec. during time *t*
*de*=± element displacement error due to element jitter relative to $t_0$
*de*1=± element displacement error due to dead-reckoning when *v*E is other than nominal.

The only fixed parameters are the hammer initial and final positions and thus its travel (*d*H). (*t*) varies when parameters that affect (VH) vary, thus (*d*E) and (E1) must vary for a given (*v*E). Likewise (*d*E) and (E1) vary with (*v*E), (*de*) and (*d*E1) with a given (*t*). Compensation keeps (E) and (H) mating properly at impact and prevents misregistration of the printed character due to the parameters under its control.

Figure 2:
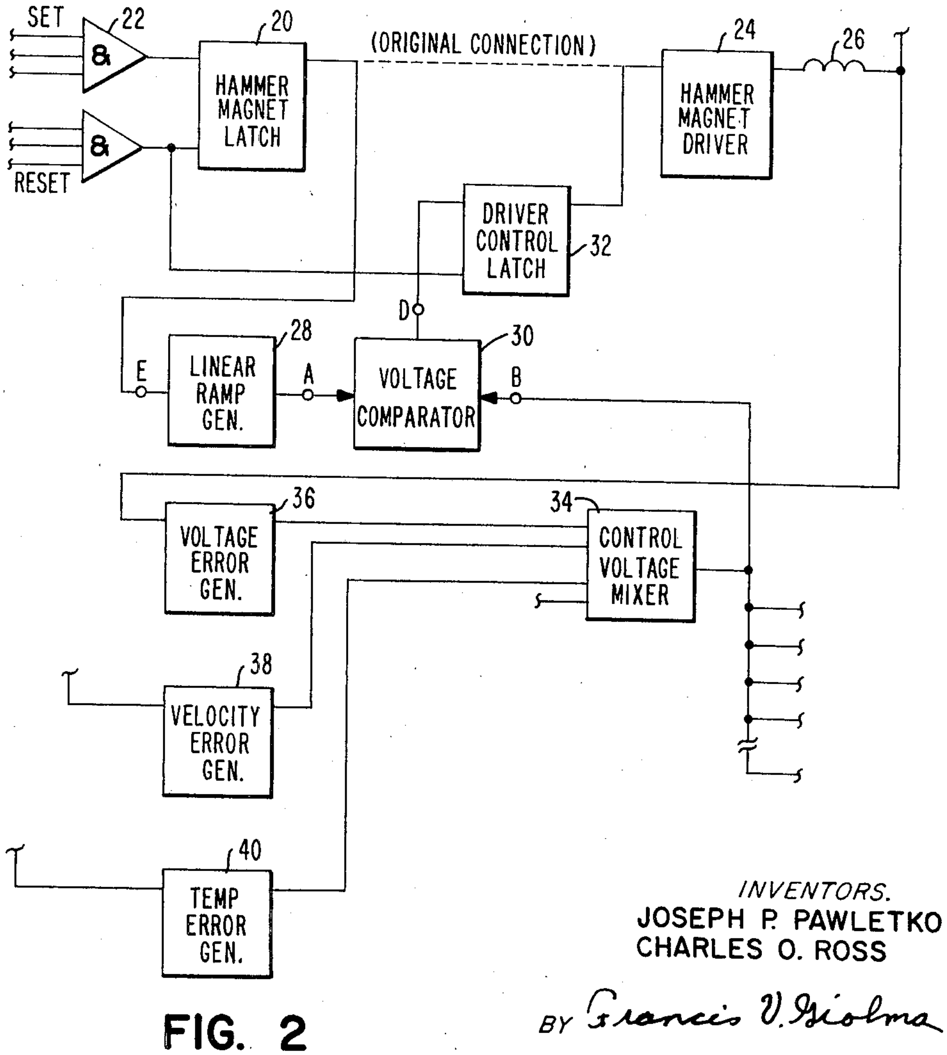
FIG. 2 is a schematic circuit diagram of a portion of a print hammer control circuit for a printer, illustrating one embodiment of the invention.

FIG. 2 shows a block diagram of a compensator circuit embodying the invention in one of its forms. As shown, a typical hammer magnet latch 20 which might be connected to respond to a set signal from AND 22 for previously operating a hammer magnet driver 24 to energize the operating magnet 26 of a print hammer for performing a printing operation, is instead connected to a linear ramp generator 28 for applying a signal to a voltage comparator 30, for operating the hammer magnet driver 24 through a driver control latch 32. The output of the linear ramp generator 28 is compared in the voltage comparator 30 with an input signal from a control voltage mixer 34 which mixes error signals from means such as a voltage error generator 36, a velocity error generator 38, and a temperature error generator 40, which are shown by way of illustration. By applying the output of the hammer magnet latch 20 to a linear ramp generator and developing a fixed ramp signal input to the voltage comparator, the relative timing of the output signal from the voltage comparator will be dependent on the value of the control voltage, and hence will vary the time of operation of the hammer magnet driver 24 in accordance with the values of the error input signals to the control voltage mixer, thereby compensating for the errors in the parameters being compensated for.

Figures 3, 7:
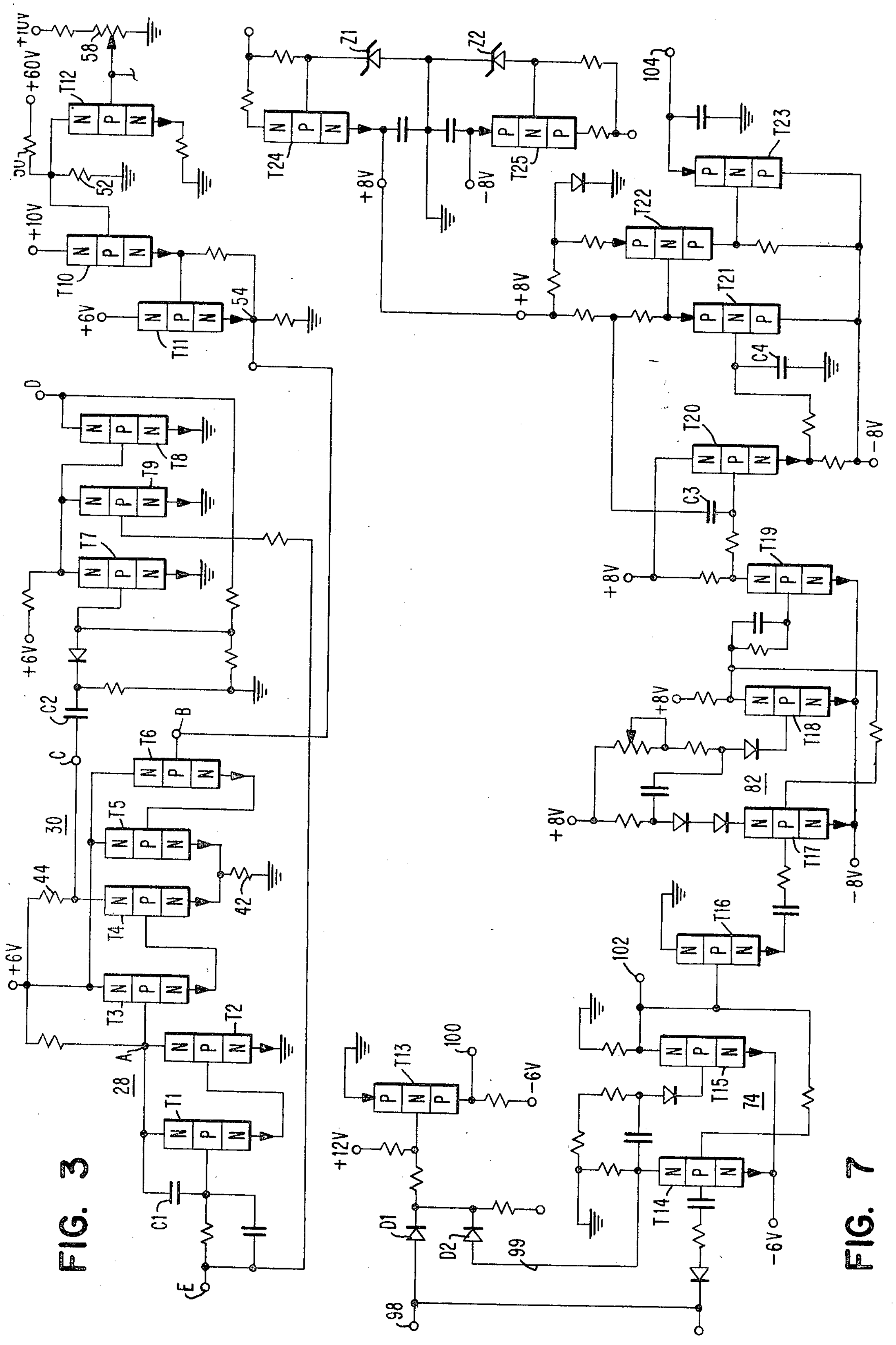
FIG. 3 is a circuit diagram illustrating in further detail the linear ramp generator, voltage comparator, and voltage error generator circuits of FIG. 2.
FIG. 7 is a circuit diagram showing in greater detail the circuitry of the velocity compensating circuit of FIGS. 4 and 5.

Referring to FIG. 3, it will be seen that the ramp generator comprises a Miller generator utilizing a capacitor C connected between the base and collector of a transistor T1 which is connected in a Darlington configuration with a transistor T2 to provide an input to the point A of the voltage comparator 30. This provides for delayed shut off of the transistor T1 and generates a ramp signal for each pulse applied at terminal E.

The comparator 30 comprises a pair of Darlington configurations utilizing transistors T3 and T4 on the left-hand side with the point A as an input to the base of the transistor T3, and transistors T5 and T6 in the right-hand configuration with the point B as the input from an error voltage control circuit. By connecting the emitters of transistors T4 and T5 to ground through an emitter resistor 42, connecting the collectors of transistors T3 and T5 and T6 to a common collector source directly, with the collector of transistor T4 connected through a collector resistor 44, a negative going output signal may be developed at the point C when the voltage of the point A is equal to or greater than the voltage applied to the point B by the control voltage. The point C is connected through a coupling capacitor C2 to a latch comprising transistors T7 and T8 to provide a time-corrected output signal at the terminal D. Transistor T9 connected in parallel with the transistor T7 provides for reset by having the base electrode thereof connected back to the input terminal E.

The voltage error detection circuit may comprise a voltage divider consisting of resistors 50 and 52 connected between the magnet source voltage and ground. Transistors T10 and T11 connected in a Darlington configuration provide an error control voltage at the emitter terminal 54 while presenting a high impedance load to the voltage divider. This error voltage may be held to a nominal value of, for example, 3.5 volts by connecting the midpoint of the voltage divider to ground through a control transistor T12 having its base electrode connected by means of a potentiometer 58 to a suitable source of control voltage whereby the level of the emitter voltage of the transistor T11 may be set.

Thus, from FIG. 2, instead of directly energizing the hammer magnet driver 24 from the hammer magnet latch 20 in response to input signals from the AND 22 as heretofore, the output of the hammer magnet latch 20 is instead utilized to develop a ramp signal through the linear ramp generator 28, which is applied to a voltage comparator 30 for varying the relative time at which the output of the hammer magnet latch 20 is applied to the hammer driver magnet 24 in accordance with the control voltage applied to the voltage comparator 30 from the different error detection circuits 36, 38 and 40. The relative timing of the signal applied to the hammer magnet driver 24 will depend on the original signal from the hammer magnet latch 20 and the values of the error voltages utilized to provide the control voltage input to the comparator 30. Thus the timing of the energization of the type hammer magnet coil 26 may be varied to compensate for errors in the voltage of the source, the velocity of the type element and temperature effects. By varying the adjustment of the potentiometer 58 (in FIG. 3), manual adjustments in the relative timing may be made to compensate for individual differences in flight time of the individual print hammers for each of the print positions. If desired, other error signals can be applied to the base of transistor T12 for effecting compensation therefor.

For machines which, for economic and/or other reasons do not require electrical manual adjustment of the timing or extensive compensation, a less costly implementation can cause compensation at one point for all print positions instead of within the circuitry of each position as previously described. The end result is equivalent compensation for those parameter error functions included but at a greatly reduced cost.

In the example discussed, voltage error compensation has been described. Since a correction range on the order of 120 microseconds is desirable, the nominal delay can be set at around 60 microseconds, or half the desired range, by adjusting the potentiometer 58. If other errors are compensated for, the adjustment can be changed accordingly. It will be understood, of course, that this nominal delay will be compensated for by suitably adjusting the emitter or transducer timing to give the proper timing under normal conditions.

Figure 4:
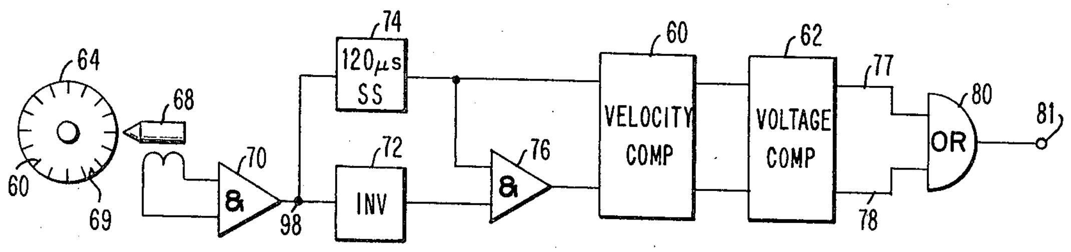
FIG. 4 is a schematic circuit diagram in part of a printer control circuit illustrating a further embodiment of the invention.

Referring to FIG. 4 of the drawings, it may be seen that a print hammer enabling signal such as for example is generated by the timing disc 47 of Pat. No. 3,289,576 which issued on Dec. 6, 1966, to E. M. Bloom, Jr., et al., may instead be modified before utilizing it in the control circuits of the printer, by passing the signal through a velocity compensating circuit 60 and a voltage compensating circuit 62. As shown, the timing disc 64 is provided with a plurality of equally spaced slots 66 around the periphery thereof for inducing uniformly spaced pulses in a magnetic read head 68 in accordance with movement of the type characters past the different print positions. Between two of these slots is provided an additional slot 69 which generates a pulse which serves to identify the next pulse as the first or home pulse. The pulses from the head 68 are passed through an amplifier 70 and then are fed to an inverter 72 and a 120-microsecond single shot 74, the output of which is fed both to the velocity compensating circuit 60 and to an AND 76, which is gated by the output of the inverter 72 in order to isolate the home pulse which is also applied to the velocity compensating circuit as shown. The compensated drum pulse output over conductor 77 and the home pulse output over conductor 78 are mixed in an OR circuit 80 from whence it may be utilized in the usual manner of the original pulses generated to control the operation of the print hammer circuits.

Figure 5:
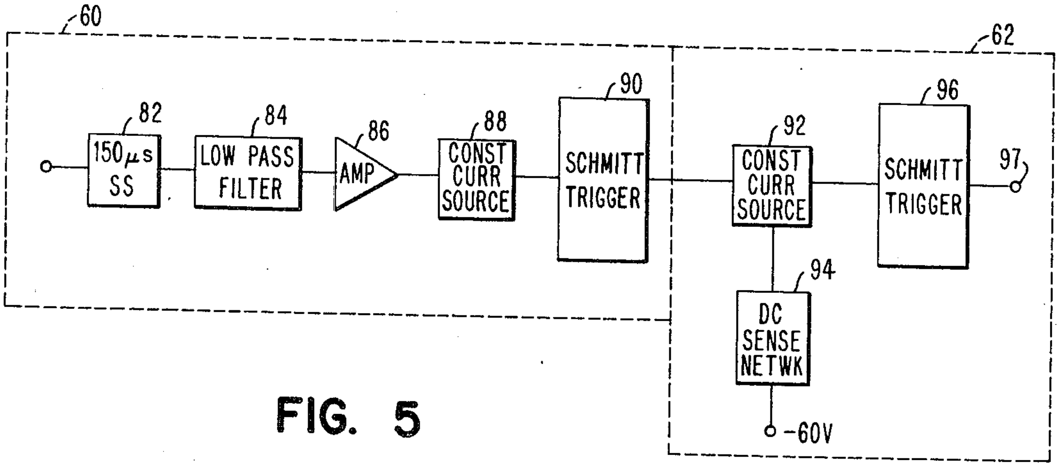
FIG. 5 is a schematic circuit diagram illustrating in further detail portions of the circuit shown in FIG. 4.

Referring to FIG. 5, it will be seen that the velocity compensating circuit 60 may comprise generally a precision single shot 82 connected to a two-section low pass filter 84 for producing and averaging a velocity error voltage, which is then applied to an amplifier 86 to control the reference voltage of a constant current ramp 88 which is connected to fire a Schmitt trigger 90. The output of the velocity correction circuit is applied to a constant current ramp circuit 92 in the voltage compensating circuit 60 which is referenced by a voltage error sensing network 94 for controlling a Schmitt trigger 96 to provide an output voltage at the terminal 97 which is both velocity and voltage error compensated.

Referring to FIG. 7 of the drawings, it will be seen that pulses from the timing disc head 68 are applied at terminal 98 to the 120-microsecond single shot 74 which comprises a pair of transistors T14 and T15 connected in a well-known single shot configuration. The output of the single shot 74 is connected over a conductor 99 to an AND comprising diodes D1 and D2 where it is gated with the output from the emitter head 68 to separate the home pulse which appears at terminal 100 and the drum pulse which will appear at the terminal 102. The drum pulse from terminal 102 is applied through an emitter follower transistor T16 to a 150-microsecond single shot comprising transistors T17 and T18. The output of the single shot 82 is applied to a two-section filter through a transistor T19. The two-section filter comprises capacitors C3 and C4 coupled with the transistors T20 and T21. Since a change in speed moves the trailing edge of the drum pulse relative to the output of the single shot, the low pass filter acts as an integrator and senses the average of the drum pulse error relative to the single shot output. Transistors T22 and T23 provide amplifying and buffer circuits to produce a velocity analog error voltage output at terminal 104. Transistors T24 and T25 together with Zener diodes Z1 and Z2 provide a $\pm 8.5$ volt power source for the velocity analog error voltage circuit and the voltage error circuits.

Figure 8:
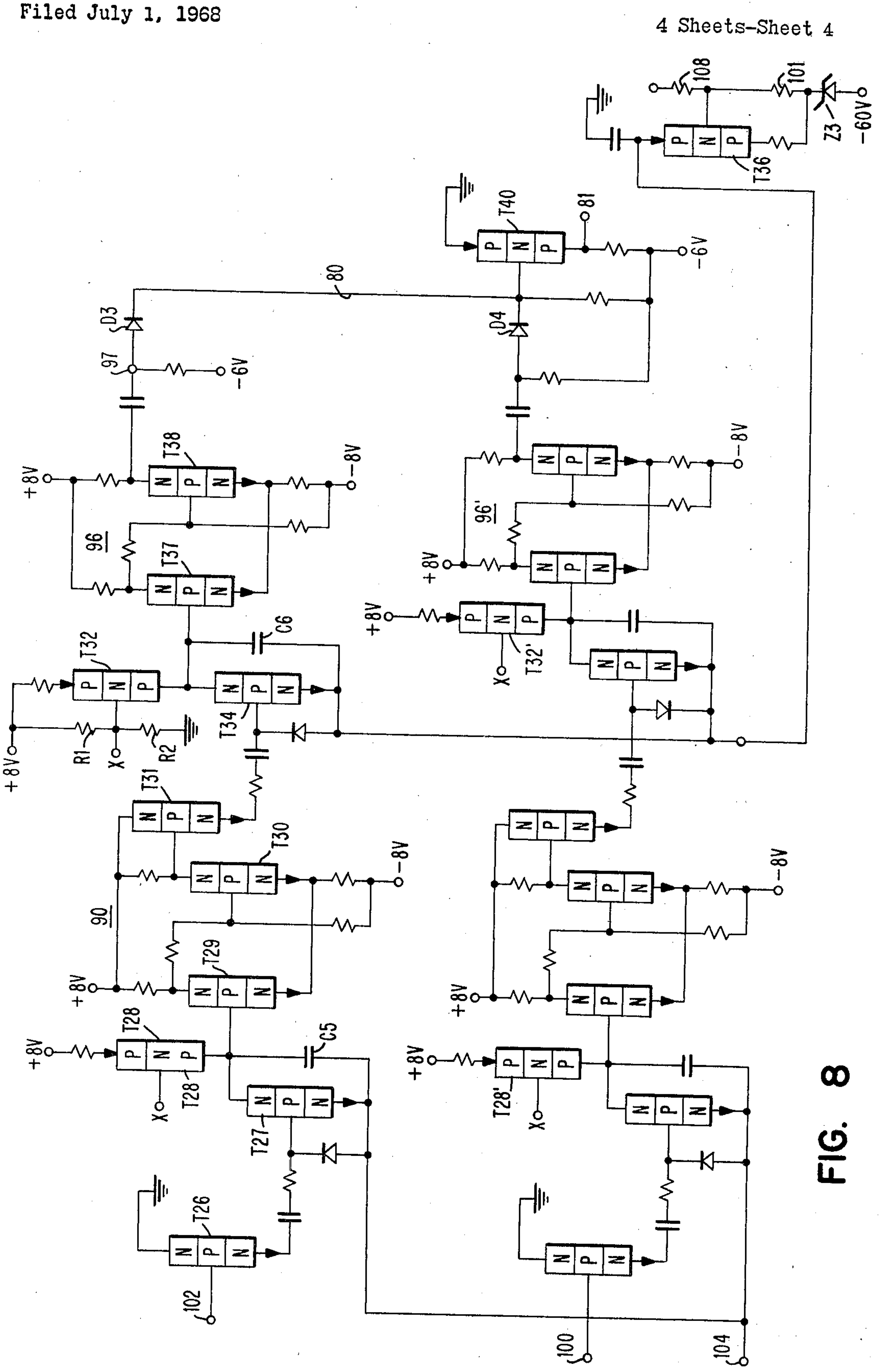
FIG. 8 is a circuit diagram illustrating in further detail the circuitry of the voltage compensating portion of the circuit of FIGS. 4 and 5.

Referring to FIG. 8, it will be seen that two identical channels are provided, the one at the top for the drum pulse and the one at the bottom for the home pulse. Since the circuitry and function of both channels are identical, the description will be limited to that of the drum pulse channel at the top of the figure. The drum pulse from terminal 102 of FIG. 7 is applied to two transistors T26 and T27 for controlling the discharge of a ramp capacitor C5 which is charged from a constant current source represented by the transistor T28, thus providing a ramp signal. The velocity error signal from the velocity compensating circuit 60 generated at terminal 104 in FIG. 7 is applied to the lower end of the ramp capacitor C5, thus referencing the level of the ramp capacitor in accordance with the value of the velocity error signal. The input side of the capacitor C5 is connected to control a Schmitt trigger 90 consisting of transistors T29 and T30 by varying the time at which the trigger is set dependent on the value of the reference voltage from the velocity error detection circuit.

The output of the Schmitt trigger 90 is applied to control an additional ramp generator consisting of a capacitor C6 charged from a constant current source such as the transistor T32 and discharged under the control of a transistor T34 in response to the output from the Schmitt trigger through transistor T31. The base terminals of transistors T28 and T32 are connected together to the midpoint of a common divider comprising resistors R1 and R2, as are the base terminals of the corresponding transistors T28′ and T32′ of the home pulse channel. A voltage error signal is generated from a voltage divider comprising a Zener diode Z3 connected in series with resistors 108 and 110 between the hammer magnet voltage source and to ground. By connecting the base of the transistor T36 intermediate the resistor 108 and the resistor 110 an error voltage may be generated at the emitter of the transistor for application to the ramp generator circuit for referencing it. The terminal of capacitor C6 on the charging side is connected to the base of transistor T37 which with transistor T38 comprises a Schmitt trigger for controlling the relative firing time of the trigger. The output of the Schmitt trigger is ORed with the output of the corresponding Schmitt trigger 96′ of the home pulse channel through diodes D3 and D4 respectively for controlling an output transistor T40 to provide a velocity and voltage error compensated output signal at output terminal 81.

Figure 6:
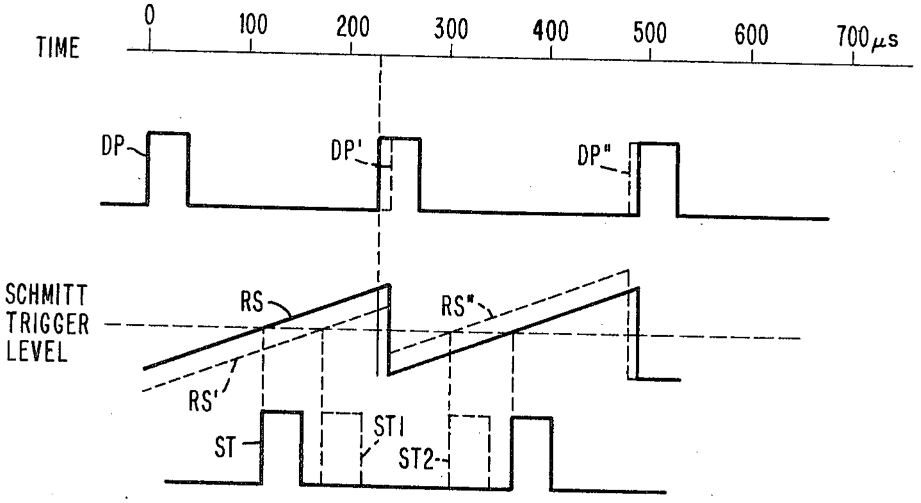
FIG. 6 shows curves illustrating the compensating effects of the circuit elements shown in FIGS. 4 and 5.

It will thus be realized that when variations in the velocity of the type train occur, changes in speed of the emitter disc move the trailing edge of the drum pulse relative to the single shot (82) pulse so that a velocity error voltage is generated. By using this voltage to reference the ramp circuit *n* the velocity compensation circuit, the level of the ramp curve can be changed thus changing the time at which the Schmitt trigger (90) fires and therefore changing the time at which the Schmitt trigger output occurs so as to in effect change the timing of the drum pulse. This relationship is shown by the curves in FIG. 6 in which the solid curve DP represents the normal drum pulse and the dotted lines DP′ and DP″ represent the leading edges of the pulses under lag and lead conditions thereof. The error signals generated from these lag and lead conditions translate the ramp curve RS from the normal solid position to the dotted position RS′ which illustrates a lag condition, and the position RS″ which illustrates a lead condition. The timing of the output of the Schmitt trigger is changed from the normal positions shown by the solid curve ST to the corrected positions shown by the curves ST1 for a drum pulse delayed and the corrected position ST2 for a drum pulse leading. By cascading the velocity error compensation and the voltage error compensation circuits similar time corrections can be made for both error in the velocity of the type train and changes in the flight time of the type hammer due to variations in source voltage; the output pulse from the compensating circuits may be used to control the operation of the high speed printer to change the timing of the enabling pulses applied to the hammer select matrix for operating the print hammers in the proper timing relation to the moving type elements. It will be noted that the Schmitt trigger pulses are delayed on the order of 100 microseconds under normal conditions to allow a $\pm$ range of correction.

From the above description and the accompanying drawings, it will be apparent that the present invention provides a simple and effective control for a high speed printer for correcting for errors caused by variation in the source voltage and/or variations in the speed of the type carrying element. Because only 243 microseconds occurs between drum pulses, and the correction range it is desired to operate with covers a range of $\pm 150$ microseconds, the velocity compensation circuit and the voltage error compensation circuit are cascaded. The order of cascading is in itself immaterial and the order may be changed if desired. Variations in the power supply voltage translated into flight time variations amount to around 10 microseconds per volt variation. Velocity correction amounts to about 6.7 microseconds per microsecond deviation from normal velocity. By utilizing error compensation circuits of the type hereinbefore described, a noticeable improvement in the uniformity of printing is obtainable. The invention may be applied to printers with direct hammer type impact in which a type character impacts a ribbon against a paper on which the printing operation is to be performed and also to printers with indirect impact in which the hammer pushes the paper and the ribbon against the type element.

While the invention has been particularly shown and described with reference to preferred embodiments thereof, it will be understood by those skilled in the art that various changs in form and details may be made therein without departing from the spirit and scope of the invention.

What is claimed is:

1. In a control circuit for a printer having a continuously moving element with type characters thereon positioned to move said characters past a print position in sequence, said element having a print hammer associated therewith at said print position with electromagnetic means for effecting operation thereof to impact a selected type character and a document on which a printing operation is to be performed, and means operated in synchronism with said moving element for producing enabling signals to effect energization of said electromagnetic means in timed relation with the presence of a type character at said print position to perform the printing operation, means for producing a control voltage in response to variations in a quantity affecting relative timing of the electromagnetic means and the moving element and hence the print quality, and circuit means including means for translating said control voltage into a time related signal connected to modify the relative timing of said enabling signals in a direction to compensate for said variation in said quantity and improve the print quality.

2. The invention as defined in claim 1 characterized by the means for producing a control voltage comprising a voltage sensitive circuit for producing an error signal responsive to deviations in the voltage of the source for energizing the electromagnetic means.

3. The invention as defined in claim 1 characterized by the means for producing a control voltage comprising a velocity error analog circuit which produces a velocity error signal which is proportional to the deviation in speed of the type character bearing element.

4. The invention as defined in claim 1 characterized by the means for producing a control voltage comprising both voltage and velocity error sensitive circuits connected in cascade for time compensating the enabling signal.

5. The invention as defined in claim 1 characterized by the means for producing enabling signals including a magnetic pulse emitter having a slotted disc driven in synchronism with the moving type character bearing element and a pickup.

6. The invention as defined in claim 5 characterized by the pulse emitter pickup being connected to a temperature stable single shot and a filter circuit to provide a velocity error analog voltage source.

7. The invention as defined in claim 6 characterized by the velocity error analog voltage source being connected to reference a ramp circuit including a capacitor charged from a constant current source and connected to be discharged by pulses from the emitter said capacitor being connected to activate a Schmitt trigger so as to vary the effective timing of the emitter pulses in accordance with a velocity error of the type character bearing element.

8. The invention as defined in claim 7 characterized by the output of the Schmitt trigger being connected to discharge an additional capacitor charged from a constant current source and referenced to a voltage error signal.

9. The invention as defined in claim 8 characterized by the additional capacitor thereof being connected to activate an additional Schmitt trigger to provide a voltage error time correction for the emitter pulses in addition to the velocity error correction.

10. The invention as defined in claim 8 characterized by the emitter disc having a plurality of substantially uniformly spaced pulses generating slots about the periphery thereof which provide a plurality of drum pulses with an additional slot intermediate the last and first of the drum pulse slots, and there being means including a single shot, an inverter and an AND circuit connected to the emitter to separate the home pulse from the drum pulses, with duplicate velocity and voltage error correction circuits for the drum and home pulses which are ORed to provide a compensated composite signal output.

References Cited

UNITED STATES PATENTS

| | | | |
|---|---|---|---|
| 2,997,632 | 8/1961 | Shepard | 317—148.5 |
| 3,183,830 | 5/1965 | Fisher et al. | 101—93 |
| 3,285,165 | 11/1966 | Richter | 101—93 |
| 3,289,576 | 12/1966 | Bloom et al. | 101—93 |
| 3,312,174 | 4/1967 | Cunningham | 101—93 |
| 3,374,402 | 3/1968 | Derc | 317—148.5 |
| 3,423,641 | 1/1969 | Von Feldt | 317—137 |
| 3,435,299 | 3/1969 | Schwartz | 317—148.5 |
| 3,443,514 | 5/1969 | Schwartz | 101—93 |

W. B. PENN, Primary Examiner

U.S. Cl. X.R.

317—148.5